United States Patent Office 3,034,297
Patented May 15, 1962

3,034,297
COMBUSTION CHAMBERS
Peter Frederick Orchard and Kenneth William Clark, Bristol, England, assignors to Bristol Siddeley Engines Limited, Bristol, England, a company of Great Britain
Filed Dec. 11, 1959, Ser. No. 859,056
Claims priority, application Great Britain Dec. 15, 1958
5 Claims. (Cl. 60—39.65)

This invention relates to the arrangement and construction of combustion chambers for use in combination with rotary machines such as compressors capable of discharging combustion-supporting medium (hereinafter referred to more shortly and without prejudice as "air") with a rotary swirl through an annular outlet.

The present invention provides an annular combustion chamber for use with air supplied with a swirling motion around the axis of the combustion chamber has an inner wall and an outer wall providing an inlet at one end of the combustion chamber and an outlet at the other end of the combustion chamber and comprises at least three concentric annular partitions extending from the inlet along part of the axial length of the combustion chamber and dividing the combustion chamber over that part of its length into at least four passages each having an inlet and an outlet, the outlets of all the passages being within the combustion chamber and spaced from the outlet of the combustion chamber, the innermost passage and each alternate passage being shaped to enable air to flow therethrough from the inlet of the combustion chamber with a swirling motion around the axis of the combustion chamber and without substantial change of velocity and the passage adjacent the innermost passage and each alternate passage being shaped to provide a sudden increase of cross-sectional area adjacent its inlet.

The invention permits a reduction in the length to diameter ratio of the combustion chamber to be achieved, which is of particular value in turbojet engines intended to be mounted in an aircraft wing with their axes perpendicular to the chordal plane so as to provide direct lift.

Figure 1:
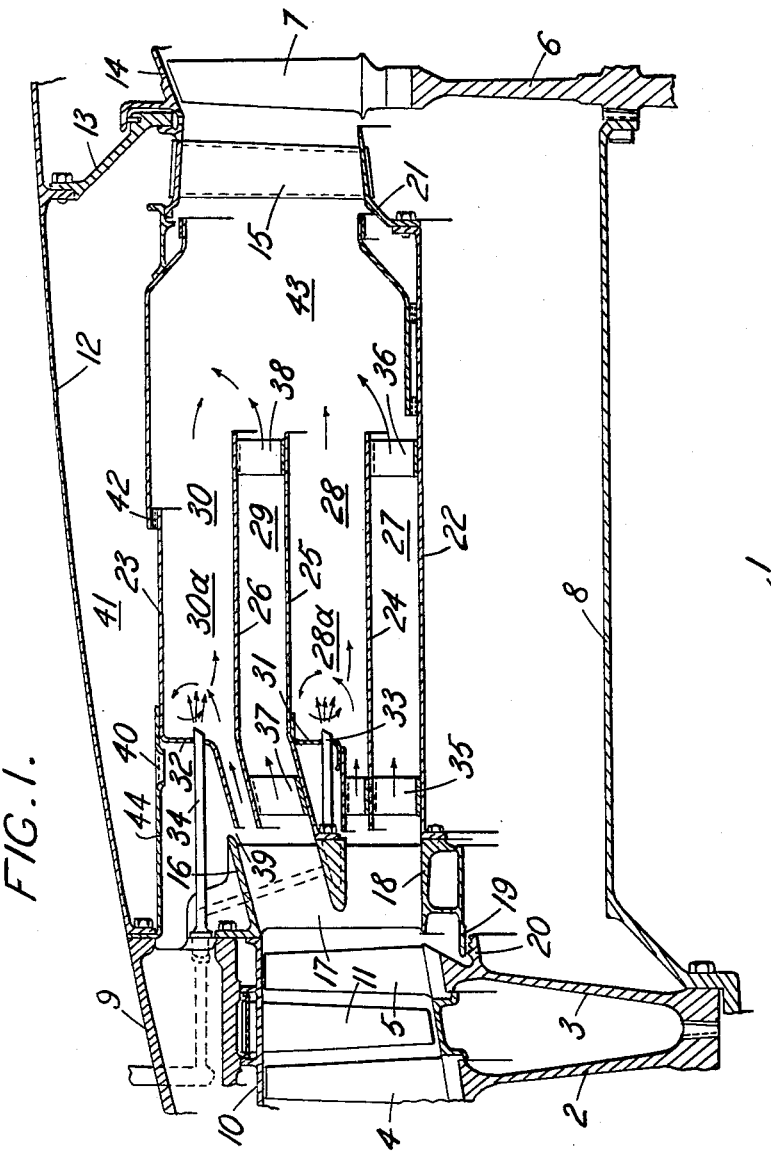
Figure 2:
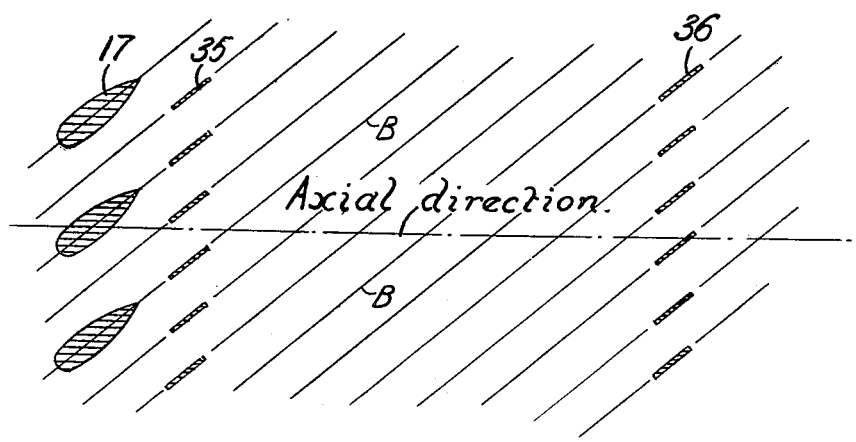

One embodiment of the invention will now be described with reference to the accompanying drawings of which FIGURE 1 is a section through part of an aircraft engine embodying the invention, and FIGURE 2 is a section through the vanes 17, 35 and 36.

The drawing shows the relevant parts of a direct lift engine designed for mounting in the wing or fuselage of an aircraft with its shaft axis 1 vertical in relation to the take-off attitude. The engine comprises a rotary system including compressor discs 2 and 3 carrying blades 4 and 5, a turbine disc 6 with blades 7, and an interconnecting shaft element 8. The rotary system is supported by bearings, not shown, in an outer casing comprising an inlet end part 9 supporting a compressor stator 10 with blades 11, and a shell 12 to which is attached a diaphragm 13 providing support for a turbine stator structure 14 including nozzle guide blades 15. The inlet end part 9 also supports, at the outlet of the compressor, an outer ring 16 connected by vanes 17 to an inner ring 18 carrying one part 19 of a labyrinth seal the other part 20 of which is on the compressor disc 3. The compressor is designed to run at a predetermined design speed and, at that speed, discharges air into the combustion chamber with predetermined swirl and axial velocities. These swirl and axial velocities are herein referred to as the "designed axial velocity" and the "designed swirl velocity". As shown in FIGURE 2 the vanes 17 are angled with respect to the axial direction so that the swirl velocity of the air leaving the compressor at design speed is not substantially altered (the direction of swirl being indicated by lines B). The inner ring 18 and an inner ring 21 connecting the nozzle guide blades 15, are connected by an inner air casing 22. The shell 12 constitutes the outer air casing, but the outer wall of the combustion chamber proper is constituted by a structure 23 spaced inwardly from it, so that the intervening space forms a cooling air jacket, the structure 23 being connected at the compressor end to the shell 12 and supported at the turbine end by the turbine stator structure 14. For somewhat over half its length from the compressor end the combustion chamber, defined between the inner air casing 22 and the outer wall structure 23, is divided by three partitions 24, 25 and 26 into four coaxial annular passages 27, 28, 29 and 30. The outermost passage 30 and the inwardly alternate passage 28 are made divergent adjacent their inlet ends by wall members 32 and 31 respectively which project inwardly from the outer wall of the passage and then turn upstream. Zones 28a and 30a of sudden enlargement are thus formed in which the speed of the inflowing air is decreased and its turbulence is increased to a level permitting the maintenance of stable combustion of liquid fuel admitted into the zones through burners 33 and 34. The innermost passage 27 and the outwardly alternate passage 29 are of approximately uniform cross-section so as to convey dilution air past the combustion zones 28, 28a and 30a without substantial change of the designed axial or designed swirl velocities. For structural reasons, the casing 22 is connected to the partition 24 by vanes 35 and 36 crossing the passage 27 and the partitions 25 and 26 are interconnected by vanes 37 and 38 crossing the passage 29, but all these vanes are angled to conform with and not substantially alter the swirl of the dilution air passing through these passages. At their entry ends the passages are given cross-sectional areas related to one another in accordance with the desired division of the total airflow into combustion air and dilution. A relatively small proportion of the total airflow passes through a gap 39 between the part 32 of the outer wall structure and the ring 16 and through a number of holes 40 in a cylindrical ring 44 extending between the shell 12 and structure 23 into the cooling jacket space 41. From thence the cooling air passages back into the combustion chamber proper through a louvre system 42 formed in the wall structure 23.

The part 43 of the combustion chamber beyond the downstream ends of the partitions constitutes a mixing zone into which all the passages discharge and from which the mixed products of combustion and dilution air flow through the nozzle guide blades 15 to the moving turbine blades 7. By reason of its swirl velocity and higher density the dilution air leaving the passages 27 and 29 diffuses by centrifugal effect, and without the aid of mechanical mixing devices, outwardly through the products of combustion leaving the passages 28 and 30.

The invention is not limited to the precise structural details hereinbefore described. For example the combustion chamber may have formed therein a further annular passage surrounding passage 30 and cooling air will be passed through this further passage so that the structure 23 will be protected from the combustion temperature of the gases in passage 30.

We claim:
1. Combustion equipment for use with a swirling combustion-supporting medium comprising a structure including inner and outer walls each formed as a surface of revolution about a common axis, which walls form between them an axially directed annular inlet at one end, an annular combustion chamber to which the inlet leads, and at the other end an axially directed outlet leading from the combustion chamber, and at least three annular partitions carried by said structure, which partitions are centered on said axis and disposed one within the other between said inner and outer walls, and which partitions serve to divide the space between said walls into an even number of axially-extending concentric annular passages, each of which has an annular entry facing upstream and opening to said inlet and an annular outlet facing downstream and opening to said combustion chamber, the innermost passage and each alternate passage having a substantially constant cross-sectional area along its length, and the outermost passage and each alternate passage having intermediate its ends a sudden increase in the cross-sectional area of the passage in the direction of flow through the equipment, and fuel injection means mounted on the structure and arranged to inject fuel into the outermost passage and each alternate passage at the location of the increase of cross-sectional area.

2. Combustion equipment as claimed in claim 1, wherein the inner wall of the pair of walls defining the outermost passage and each alternate passage extends in the same direction as said axis, and the outer wall of the pair of walls has a portion which diverges substantially at right angles from the inner wall of the pair and thereafter continues parallel to the inner wall.

3. Combustion equipment as claimed in claim 1 wherein partition support vanes are provided extending from a wall of the combustion chamber to the adjacent partition and between the partitions at the inlets of the passages defined respectively by the wall and adjacent partition and by the partitions, the vanes being helically inclined relative to said axis thereby to permit swirling air to enter the passages without substantial obstruction.

4. Combustion equipment as claimed in claim 3 wherein partition support vanes are provided joining the wall and partition defining the innermost passage and the partitions defining each alternate passage, at the outlet from each such passage, the vanes being helically inclined at substantially the same angle as said partition support vanes at the inlets of the said passages.

5. A gas turbine comprising an annular combustion chamber as claimed in claim 1 and a rotary compressor connected to discharge air into the annular combustion chamber with a swirling motion around the axis of the combustion chamber.

References Cited in the file of this patent

FOREIGN PATENTS

| | | |
|---|---|---|
| 620,270 | France | Mar. 22, 1949 |
| 1,173,468 | Great Britain | Oct. 27, 1958 |